United States Patent
Whitley et al.

(10) Patent No.: US 6,277,932 B1
(45) Date of Patent: Aug. 21, 2001

(54) POLYMERIZATION PROCESSES AND PRODUCTS

(75) Inventors: Martin William Whitley, Bingley; Gareth Ian Naylor, Halifax, both of (GB); David Andrew Houlton, Brussels (BE); Jonathan Heath Veal, Halifax; Robert David Burrows, Bradford, both of (GB)

(73) Assignee: Ciba Specialty Chemicals Water Treatments, Ltd., West Yorkshire (GB)

( * ) Notice: Subject to any disclaimer, the term of this patent is extended or adjusted under 35 U.S.C. 154(b) by 0 days.

(21) Appl. No.: 09/341,497

(22) PCT Filed: Jan. 12, 1998

(86) PCT No.: PCT/GB98/00084

§ 371 Date: Aug. 12, 1999

§ 102(e) Date: Aug. 12, 1999

(87) PCT Pub. No.: WO98/30598

PCT Pub. Date: Jul. 16, 1998

(30) Foreign Application Priority Data

Jan. 13, 1997 (GB) .................................................. 9700528

(51) Int. Cl.$^7$ ..................................................... C08F 2/08
(52) U.S. Cl. ........................... 526/88; 526/201; 526/240; 526/303.1; 526/317.1
(58) Field of Search ..................................... 526/201, 240, 526/303.1, 317.1, 88

(56) References Cited

U.S. PATENT DOCUMENTS

| 3,966,996 | | 6/1976 | Jules et al. . |
| 4,444,961 | | 4/1984 | Timm . |
| 5,252,611 | * | 10/1993 | Shih et al. ......................... 514/772.5 |
| 6,011,089 | * | 1/2000 | Davies et al. ......................... 523/335 |

FOREIGN PATENT DOCUMENTS

| 051 210 | 8/1982 | (EP) . |
| 2 097 869 | 3/1972 | (FR) . |
| 1 319 632 | 6/1973 | (GB) . |

* cited by examiner

Primary Examiner—David W. Wu
Assistant Examiner—William K Cheung
(74) Attorney, Agent, or Firm—David R. Crichton

(57) ABSTRACT

Beads are made from water-soluble monomer or monomer blend by reverse phase bead polymerization by extruding aqueous monomer beads into or onto the top of an upflowing column of non-aqueous liquid and the beads polymerise as they float downwardly through the column during a period of at least ½ minute. The resultant beads can have a very narrow particle size distribution.

18 Claims, 3 Drawing Sheets

POLYMERIZATION PROCESSES AND PRODUCTS

Figure 1:
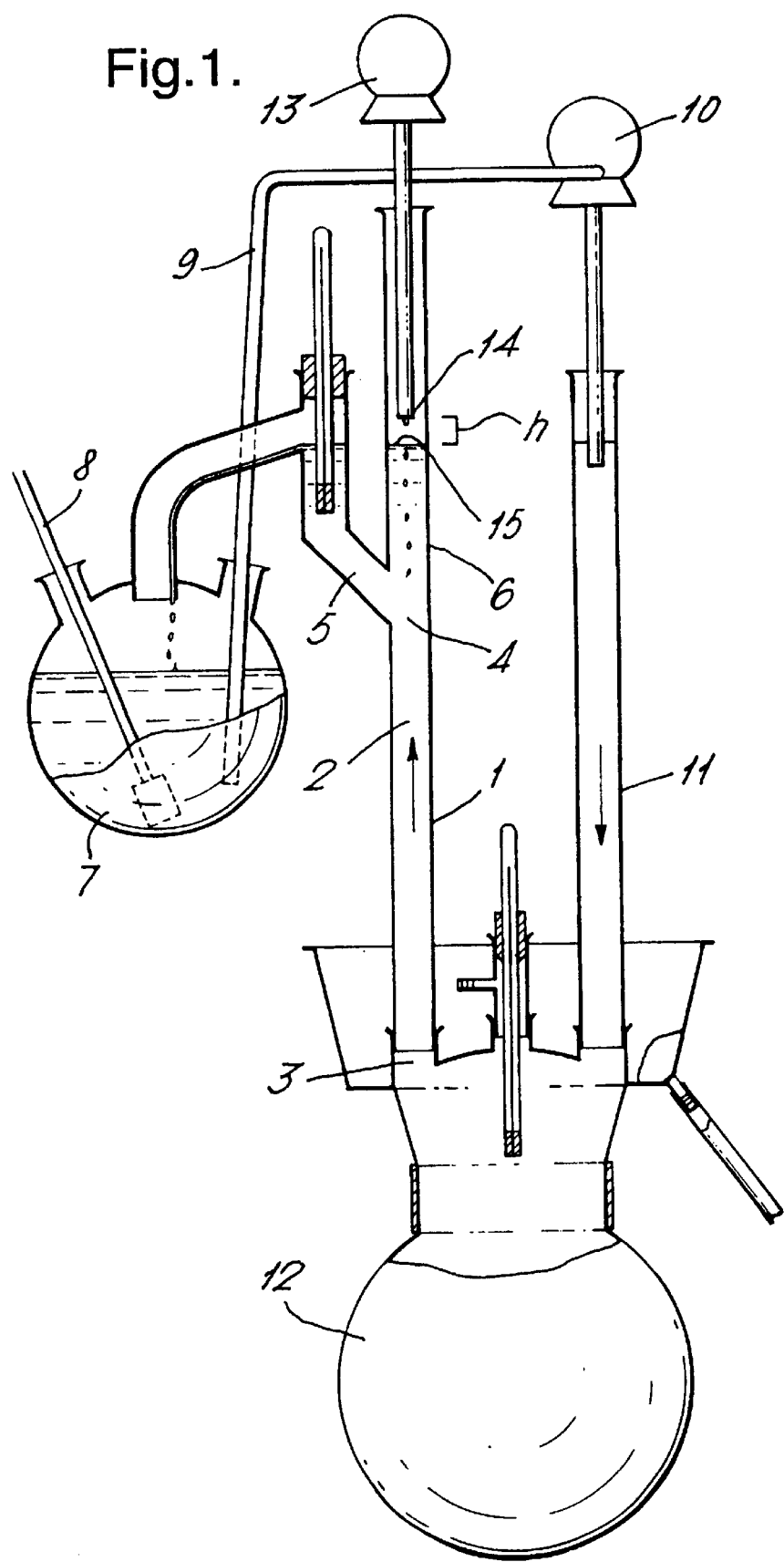

This invention relates to beads which have a narrow size range distribution and which are formed of water soluble or water swellable polymeric material, and to methods of making these beads by reverse phase bead polymerization.

High molecular weight water soluble or water swellable polymers are currently made mainly by either the gel polymerization and comminution process or by reverse phase polymerization.

In the gel process, an aqueous solution of the monomer or monomer blend is polymerised in bulk to form a rigid gel, which is then dried and comminuted. The product has a wide particle size distribution of irregularly shaped particles and includes a large amount of fines.

The reverse phase polymerization process comprises forming droplets of an aqueous solution of water-soluble ethylenically unsaturated monomer or monomer blend and polymerising the monomer or monomer blend, while the droplets are suspended in a non-aqueous liquid, to form aqueous polymer droplets. If the droplets are very small the product is a reverse phase emulsion. If the droplets are beads, the bead polymerization process is completed by drying the resultant polymer beads and separating the polymer beads from the non-aqueous liquid.

The usual way of performing a reverse phase bead polymerization process comprises charging a reaction vessel with non-aqueous liquid and dispersing the aqueous monomer or monomer blend in bulk into the liquid with sufficient agitation to form the aqueous monomer beads, and conducting the polymerization while stirring the suspension vigorously so as to keep the beads suspended in the non-aqueous liquid. The resultant particle size distribution is much narrower, and the amount of fines is much less than when the polymer is made by the widely used gel polymerization and comminution process and this is advantageous. However the reverse phase bead polymerization process does have a tendency to produce beads having a wider size distribution than would be desired including fines and some mis-shapen beads. This is due to the inevitable collisions and shearing forces applied to the monomer droplets and to the polymerising beads, especially in large scale commercial processes.

Although the product can be sieved or otherwise classified according to size, this inevitably still leads to a product having a fines fraction and a significant spread of particle sizes. For instance fines become trapped on the surface of larger beads and sieving does not separate them. Attempts to obtain a narrower size distribution by sieving to a very narrow size range are not practicable on a large commercial scale (for instance above 1 kg or above 10 kg) and again the final product still contains fines.

The products, contaminated with fines, have been widely used on a commercial scale and are considered satisfactory for many purposes. For instance water soluble beads are used on a large scale for dissolution in water to form a flocculant or viscosifying solution and cross linked, water swellable, beads are used for delivering, by a sustained release mechanism, active ingredient distributed through the beads. Because of their more regular shape and narrower size distribution and lower fines production, they are often preferred over products made by gel polymerization and comminution. However it would be desirable to produce beads which have better performance properties, for instance handling and dissolution or release properties.

It is known to conduct oil-in-water emulsion and bead polymerization processes, using water-insoluble monomer or monomer blend dispersed in water, under conditions whereby collisions between the beads during polymerization can be reduced. For instance in GB 1,124,610 it is proposed to form a monomer emulsion, having a particle size below 5 $\mu$m, and to feed this into a simple tubular loop reactor in which the tubular reactor has an upwardly extending tubular leg which leads, at its top, into a downwardly extending tubular leg. Monomer emulsion is fed into the base of the upwardly extending leg and polymer emulsion is taken, when appropriate, from the base of the downwardly extending leg. The upward and downward movement of the emulsion is due, at least in part, to changes in specific gravity as the polymerization proceeds. The polymerization period is suggested as 0.5 to 20 hours, preferably 1 to 10 hours.

In U.S. Pat. No. 3,922,255 a blend of water-insoluble monomers is fed through orifices (to form non-aqueous beads) into the base of a vertical column along with an aqueous medium containing a stabiliser such as gelatin. This aqueous medium and the non-aqueous monomer beads travel together upwardly through the column and thereby form a dispersion of beads in water in the column. In an example, the time of travel through this column averages 3.5 minutes. The dispersion is taken from the top of this column through a line and fed to the top of a downwardly extending column heated to a temperature at which polymerization is initiated. Accordingly there is no initiation of polymerization until a considerable period after contact of the beads with the continuous phase, including passage through a feed line. The beads and the aqueous medium are caused to flow slowly down this column, with a residence time of 150 minutes in an example. The resultant slurry of partially polymerised beads is taken from the base of the column, some of the aqueous medium recycled to the top of the column, and the beads and the remainder of the aqueous medium are fed to a reactor where they are subjected to further reaction for, in an example, four hours.

In EP 67,415, water-insoluble monomer is fed through a droplet generator into an aqueous suspension medium containing a stabiliser so as to form a suspension of droplets in the aqueous medium. This suspension is then fed through a line to the top of a column where polymerization is initiated and the aqueous medium flows downwardly at a rate such that the droplets initially reside at the top of the column but sink, concurrent with the downflowing liquid, as polymerization progresses. In an example, the residence time in this column is 170 minutes. The aqueous medium and the droplets are then reacted under plug flow conditions in another reactor, and the resultant suspension of partially polymerised beads in aqueous medium is then fed into a third reactor which is another column and wherein aqueous medium flows upwardly and the polymer beads, when they are completely polymerised, sink to the base of the column and are recovered. The total polymerization time is around 5 hours in an example.

Other disclosures of polymerising water-insoluble is monomer beads include JP 51-150592, EP 271,922 and U.S. Pat. No. 4,579,718.

In U.S. Pat. No. 4,444,961 a particular system is described for forming a dispersion of monomer beads in an immiscible liquid, This comprises a perforated plate separating a monomer supply from a vertical column of the immiscible liquid, and a vibrating pump for pulsing beads through the perforated plate into the column. In the preferred embodiments, the monomer is water-insoluble monomer and the beads are pulsed into the base of an upwardly flowing column of water. However it is also proposed that the beads could move countercurrent to the flow of the column. It is also proposed that a water-soluble monomer blend could be pumped as beads into a column of water-immiscible liquid, in similar manner. The monomer droplets flow through this column and emerge from it as a dispersion in the immiscible liquid, after about 100 seconds in an example. The dispersion is then passed through a line into a separate vessel in which a vessel which is separate from the column in which the agitation is provided to maintain a dispersion of the droplets and polymerization is initiated.

None of these methods are capable of giving the improvement that we desire in the bead polymerization of a water-soluble monomer or monomer blend or in the properties of the resultant beads. For instance in U.S. Pat. No. 4,444,961 the agitation during polymerization will cause bead collisions, and in all the described processes the transport of the beads in an immiscible liquid before they are exposed to polymerization conditions and before they enter the first polymerization vessel will again result in undesirable bead collisions.

Ruckenstein and Hong in Polymer, Volume 36, Number 14, pages 1857 to 1860 have described a method of making highly cross linked beads by a manual method in a test tube. In three runs this method gave beads having a mean particle size of 1.3 to 2.5 mm and a relative standard deviation of 5 to 5.6%, but in a fourth run the starting monomer beads were formed more rapidly and then had a particle size of 0.46 mm and a relative standard deviation of 34%. Thus, the attempt to increase the rate of production is shown to result in very poor product quality. Further, even the slow small-scale method was stated to require large amounts of cross linking agent, at least 13000 ppm, in order to prevent coalescence of the beads.

In this small scale, slow, process for making cross linked beads, beads of aqueous monomer including sufficient cross linking agent are ejected onto the top of a 35 cm column of non-aqueous liquid from a syringe which is shown as being positioned a considerable height above the top of the column. The liquid in the column is heated to a temperature at which polymerization will occur in the beads. The beads gradually sink through the column of heated liquid as they polymerise. It is stated that the time for the beads to fall from the top of the column to the base is 7 to 9 seconds. Partial gelation had occurred by the time the beads reached the base of the column, and they were left in the base of the column for two hours in order to complete polymerization. If inadequate cross linker is used, coalescence occurs. Accordinagy the process is not applicable to more lightly cross linked beads of the type conventionally used in some supersorb polymers (e.g., below 5000 ppm and often below 2000 ppm) and it is not applicable to water soluble flocculants, viscosifiers or other beads which are wholly or substantially free of cross linking agent. Also speeding up the process is shown to give poor results, and scaling that process up to be capable of commercial production is not practicable because of the inevitable collisions that would occur during the short fall down the column if large amounts of monomer are introduced and due to the apparent tendency for stickiness at the bottom of the column unless the beads are very highly cross linked. Further, it would give a very wide particle size distribution.

This process also results in mis-shapen beads or fines due to distortion and fragmentation of the monomer beads when they drop down onto the surface of the liquid column.

Accordingly no process is available which is capable, on a commercial scale, of producing polymer beads of water soluble monomer or monomer blend and which have a size distribution which is significantly different from that which is obtained by conventional bead polymerization processes, and discussed above. Further, no beads are available which are water soluble or which contain active ingredient and which do not suffer from the disadvantages of such beads which are made by existing techniques.

According to one aspect of the invention, a reverse phase bead polymerization process for the manufacture of polymer beads comprises forming aqueous monomer beads of an aqueous solution of water soluble ethylenically unsaturated monomer or monomer blend and polymerising the monomer or monomer blend in the presence of initiator to form aqueous polymer beads while suspended in a non-aqueous liquid and then recovering the dry polymer beads, wherein the process comprises providing in a substantially upright vessel a substantially continuously upflowing, substantially non-disruptive, substantially vertical column of the non-aqueous liquid wherein the column extends upwardly between a discharge point at its base and a monomer feed point at its top, extruding the aqueous monomer or monomer blend as aqueous monomer beads through orifices into, or non-shatteringly onto, the non-aqueous liquid in the presence of initiator and at a temperature whereby polymerization initiates substantially immediately upon contact between the beads and the non-aqueous liquid, the extrusion of the beads into or on to the liquid being conducted at a position which is the monomer feed point or which is in substantially non-turbulent non-aqueous fluid communication with the monomer feed point, allowing the polymerising beads to flow downwardly, countercurrent to the upflowing liquid, to the discharge point, selecting the initiator and the rate of upflow of the column such that the polymerising beads are substantially non-coalescent when they reach the discharge point and such that the time for the beads to fall from the feed point to the discharge point is at least about ½ minute, removing a suspension of the non-coalescent beads in non-aqueous liquid from the column at the discharge point, and recovering dry, water soluble or superabsorbent polymer beads from the suspension.

Generally the beads in the suspension which is removed from the column at the discharge point are maintained under bead polymerization conditions while polymerization is completed prior to the final recovery of the dry beads.

In one preferred process of the invention the polymer which is obtained is water soluble. Generally this is made by conducting the polymerization in the absence of added cross linker. Accordingly the process is particularly valuable for the manufacture of polymeric flocculants and viscosifiers.

In other processes of the invention an active ingredient is included in the aqueous solution of monomer, whereby the active ingredient is distributed throughout the polymeric beads. Accordingly, by this means, it is possible to provide beads from which the active ingredient can be released under predetermined conditions. The beads can be soluble in water, but generally are swellable rather than soluble, for instance as a result of having been polymerised in the presence of added cross linking agent. The amount of cross linking agent can be selected between values which are relatively low and values which are high (e.g., 100 to 500 ppm up to 3000 to 10,000 ppm), according to whether rapid or slow release of the active ingredient is required.

In other preferred processes we add very small amounts (e.g., 5 to 200 ppm) of cross linking agent and in particular in some instances it is desirable to add moderate amounts (e.g., 200 to 1000 or even 2000 ppm) of cross linking agent such that the beads are superabsorbent. By superabsorbent we mean that the beads will absorb more than 30 grams, and often more than 70 or more than 100 grams, deionised water per gram dry weight of bead. The quoted amounts of cross linking agent are appropriate when it is a polyethylenically unsaturated cross linking agent. If other types of cross linking agent are incorporated different amounts may be required in order to achieve similar properties in the final polymers.

In other processes, the amount of polyethylenic or other cross-linker can be much higher, e.g., up to 1%, 5% or even 20 or 30% by weight (based on monomer). In particular the invention can be used to make gel permeation chromatography (GPC) beads, for instance formed by polymerization with 5 to 30%, often 10 to 20%, by weight polyethylenically unsaturated cross linking agent. They can have a mean size within the range of sizes typical for GPC beads.

In the invention, the aqueous monomer or monomer blend is extruded into, or non-shatteringly onto, the non-aqueous liquid as individual monomer beads having a desired size, polymerization is initiated substantially immediately the beads enter the liquid, and the beads fall gradually and independently through a substantially non-disruptive, substantially vertical, upwardly flowing column of the non-aqueous liquid.

The flow of the upwardly flowing column of non-aqueous liquid must be substantially non-disruptive, that is to say it must not disrupt the individual integrity of the monomer beads which are flowing downwardly. Thus the flow should be sufficiently non-turbulent that it does not cause unacceptable collisions of the monomer beads while they are still sticky and falling through the column, and it must be sufficiently non-disruptive that it does not cause shearing of the beads into smaller particles while they are flowing down through the column. Conveniently therefore the flow can be considered to be substantially non-turbulent. Preferably the flow is sufficiently non-turbulent (i.e., substantially laminar) that beads falling through the upflowing liquid will follow a substantially rectilinear downward path and will not encounter forces having a sufficient transverse component as to promote significant coalescence of the beads as they fall.

The column is usually wholly vertical but it can be slightly inclined provided the flow profile is such that the beads do not significantly impact on to and coalesce against the walls of the column.

The column is formed in any suitable upright vessel which is itself usually a tubular substantially vertical reaction vessel. The vessel must be free of baffles or other devices that would render the flow disruptive and turbulent. Thus preferably the column is substantially free of baffles or other turbulence-inducing features. Preferably the walls of the column are substantially smooth and parallel or taper outwardly or inwardly at an angle which is sufficiently low to avoid promoting turbulence.

The column of non-aqueous fluid flows upwardly at a rate which controls the rate of fall of the beads to a period which is within the range about ½ or 1 minute to about 30 minutes and which is sufficient (having regard to the initiator and the other polymerization conditions) for the beads to be substantially non-coalescent when they reach the foot of the column.

The rate of flow must be sufficient that the duration of fall is at least about ½ minute, and usually at least 1 minute, for two reasons. First, it is necessary to ensure that sufficient time is given for the polymerization to proceed sufficiently, before the beads reach the foot of the column, for the beads to be substantially non-coalescent by the time they reach the foot of the column. Second, it is desirable to conduct the process using a polymerization which takes a significant time to go to completion, rather than a polymerization which goes to near completion almost instantaneously, within a few seconds. This is because, as a generality, improved polymer properties are obtained with slower polymerizations than with quicker polymerizations, especially when making high molecular weight water soluble polymers or other useful polymers in accordance with this invention. In particular, if the duration of fall is, for instance, significantly less than about half a minute then it is inevitable either that significant coalescence is likely to occur at the base of the column or that the polymerization will have to be arranged to go sufficiently fast to make an inferior polymer, or both.

In the invention, the ultimate bead size of the polymer beads is substantially determined as a result of the choice of extrusion conditions (e.g., the size of the orifices), and as a result of avoiding shattering of the beads by extrusion into or closely onto the liquid, and the avoidance of substantial coalescence. The substantially immediate initiation of polymerization and the countercurrent non-turbulent flow allows optimisation of the polymerization while maintaining the bead size as the beads fall independently and non-turbulently and substantially without coalescence through the column of upflowing liquid.

The monomer beads are introduced into the upflowing column of non-aqueous liquid at the monomer feed point which is at or near the top of the column. Non-aqueous fluid may flow upwardly above the monomer feed point, for instance as a result of a monomer feed extrusion device being provided in the centre of the upright vessel and non-aqueous fluid flowing up around it. Often, however, the monomer feed point is at the top of the upflowing column in that the non-aqueous liquid is deflected at this point from a substantially vertical flow to a lateral flow or other direction which allows it to be removed from the vessel.

The discharge of the aqueous monomer beads into or onto the non-aqueous liquid may be at this monomer feed point or it may be at some position distant from it provided that position is above and is in sufficiently close and substantially non-disruptive non-aqueous fluid communication with the monomer feed point. Thus the monomer feed point may be a point at which the upflow is deflected laterally and there can be a short vertical column above this in which little or no upflow occurs but down which the beads can fall through non-aqueous liquid in a substantially non-turbulent manner without coalescence.

The extrusion of the aqueous monomer or monomer blend as monomer beads through orifices may be conducted in any manner suitable for forming a plurality of beads of predetermined size from a fluid liquid. The orifices generally have a diameter in the range 0.05 to 2 mm. There may be a plurality of extrusion needles each of which is provided with a pulsed supply of liquid or there may be a perforated grid provided with a pulsed supply of liquid.

The frequency of pulsation will be selected having regard to the rheology of the aqueous monomer bead and the non-aqueous liquid. The frequency can be determined by routine optimisation for any particular feed and needle or grid assembly. Preferably the frequency of pulsation is from 20 to 100 Herz, most preferably from 50 to 80 Herz. For instance the pulsed extrusion can be achieved by the needles discharging from a supply chamber which is subjected to pulsed variations in pressure. For instance part of the chamber may be defined by a diaphragm which is caused to vibrate at the desired frequency, for instance by means of electromagnetic vibration.

The size of the aqueous monomer beads is selected so as to provide final dry polymer beads of whatever size is desired, for instance having a weight average size in the range 30 $\mu$m to 3 mm, and often between 0.1 mm and 2 mm. Usually all the orifices are of substantially the same size and usually all discharge from a single supply chamber, and thus all discharge under the same pressure. Accordingly the initial aqueous monomer beads are preferably all of substantially the same size. In general, the ejected aqueous monomer beads are usually as uniform as possible, for instance at least 90% by weight within 15 to 30% of the weight average size. Often the size distribution is significantly less than this, for instance as discussed in more detail below.

It is generally preferred that the extrusion orifices are located in the surface or beneath the surface of the non-aqueous liquid, i.e., so that the monomer beads are extruded direct from the extrusion orifices into the non-aqueous liquid. Extrusion in this manner facilitates the formation of beads of the controlled size, and it also minimises the risk of distortion or other malformation of the monomer beads, which can occur when the beads drop down on to the surface of the non-aqueous liquid. Extrusion from orifices above the non-aqueous liquid can, however, be tolerated provided the drop distance is sufficiently small that the beads do not shatter or otherwise significantly distort when they impact on the surface of the non-aqueous liquid. Generally the extrusion orifices should not be located more than 20 mm, and preferably not more than 10 mm, above the surface of the liquid.

The process is facilitated by the presence of amphipathic polymeric stabiliser in the non-aqueous liquid. The amount can be less than the amount which is normally required for a conventional bead polymerization and the amount of active polymeric stabiliser is generally in the range 0.01 to 0.5% based on the weight of non-aqueous liquid. Suitable polymeric stabilisers are copolymers of water soluble ethylenically unsaturated monomers, such as methacrylic or acrylic acid or dialkylaminoalkyl (meth) acrylate salt, and water insoluble ethylenically unsaturated monomers such as styrene and/or fatty alkyl acrylates or methacrylates. Block copolymers such as the copolymer of polyethylene glycol and hydroxy stearic acid can be used, all as is conventional for bead polymerization of water soluble or swellable polymers.

The non-aqueous liquid can be any conventional hydrocarbon or other non-aqueous liquid such as any of those known for use in reverse phase polymerizations. For instance it may be an aliphatic, cycloaliphatic or aromatic hydrocarbon, typically having a boiling point of between 150° C. and 350° C., or an ester or ether or other water immiscible liquid.

The time required for the monomer beads to polymerise sufficiently that they become non-coalescent, while still dispersed in the fluid, is dictated by the choice of the monomer blend, the initiator system and the polymerization conditions in the vessel, such as the temperature.

The rate of descent of the beads, and thus their times of travel, depends on the size and composition of the beads, the rate of upflow, and the choice of upflowing liquid (especially the differential between the specific gravities of the beads and the liquid. Viscosifier can be included to increase the viscosity of the liquid but this is usually avoided.

The rate of upflow and the relative specific gravities on the one hand and the polymerization conditions on the other are selected in known manner such that the monomer beads polymerise to a substantially non-coalescent state before they reach the bottom of the column and in a period which is preferably not more than 30 minutes and is usually less than 15 or 20 minutes. It is generally undesirable to polymerise too fast (because of the impact this has on ultimate molecular weight) and so it is normally preferred that the beads need to polymerise for at least one minute before they become non-coalescent and often the polymerization has to be conducted for 1½ or 2 minutes, often at least 5 minutes, before the non-coalescent state is achieved.

If there is a substantially static column of non-aqueous fluid down through which the beads fall before reaching the monomer feed point, this flow will itself occupy a few seconds, for instance up to 10 or even 20 seconds or more in some processes, and so this will add to the total polymerization time.

The rate of upflow of the non-aqueous liquid through the column is usually at least 0.2, and preferably at least 0.5, cm/sec. Preferably it is not more than 3 cm/sec but speeds of up to 10 cm/sec or higher can be suitable in some processes. A particular advantage of the invention is that it is easily possible to adjust the speed of upflow (merely by adjusting the rate of pumping of the non-aqueous fluid through the apparatus) and thereby it is easily possible to change the polymerization conditions according to variations in the feed (for instance changes in the monomer or monomer blend or in the initiator or temperature) or rate of supply of monomer feed or desired end product (for instance molecular weight).

It is generally preferred that the rate of upflow at the top of the column (and down through which the monomer droplets fall) should be less than the race of upflow throughout the main length of the column. Thus there can be a static head of fluid at the top of the column or, more usually, the rate of upflow in the topmost section of the column is less than 90% and often less than 70% of the rate of upflow throughout the central part of the column. Usually it is at least 20% of the rate of upflow through the central part of the column, for instance above 40%. The reason for having a static or slower upflow at the top of the column is that the monomer droplets have a lower specific gravity than the droplets once polymerization has progressed significantly. By arranging for the upflow to be less at the top, sedimentation of the beads occurs at the top of the column even though the rate of upflow lower down the column (selected to give the desired sedimentation of the polymerising beads) is sufficiently high that it would (if applied to the monomer beads) be liable to carry the monomer beads upwardly and out of the column.

The length of the slower top portion of the column can be selected according to the rate of specific gravity change that is desired. Usually it is at least 3% and usually at least 5% of the total length of the column. It can be as much as, for instance, 20% or more but usually it is less than 10% of the total length of the column. If desired, the column can be tapered downwardly over substantially all its length, but this is usually unnecessary.

By saying that the polymerization initiates substantially immediately upon contact of the aqueous monomer beads with the non-aqueous liquid, we mean that all the components necessary to initiate polymerization are present, but of course measurable polymerization may not occur immediately since there is usually a significant induction period before it can be seen that measurable polymerization has occurred.

Generally part of a redox initiator system is in the non-aqueous liquid and the other part is in the monomer droplets in known manner, and/or the non-aqueous liquid is at a temperature sufficient to activate a thermal initiator in the monomer beads.

The polymerization temperature, and in particular the temperature of the non-aqueous liquid column and the non-aqueous liquid in the final polymerization, is generally in the range 50 to 90° C., usually around 65 or 70° C. up to 80 or 85° C.

The column leads downwardly to a discharge point at which the beads collect after they have reached the non-coalescent state. For instance a substantially non-coalescing skin will have formed around each bead or the entire bead will have become non-coalescing. Accordingly by the time the beads reach the discharge point, it is possible to expose them to turbulence and agitation (in contrast to the substantially non-turbulent and non-disruptive conditions which they have encountered previously) without significant risk of coalescence between the beads. It is often convenient for the rate of upflow of the non-aqueous liquid to be slower adjacent the discharge point than above it, so as to facilitate settling of the beads out of the liquid. Accordingly the bottom of the column can be dimensioned so as to produce a slower rate of upflow. For instance the rate of upflow over the bottom 3 to 20%, usually 3 to 10%, of the total length of the column can be less than at higher points in the column (e.g., below 90% and preferably 20–70% of the rate of upflow at higher points).

The suspension of non-coalescent beads which is removed from the column at the discharge point can be a suspension of fully polymerised beads, in which event the final beads can be recovered from it, but generally the beads are subjected to further bead polymerization conditions in a suitable polymerization vessel, This may be at the base of the column but can be any suitable vessel to which the suspension can be transferred. Transfer may be by pumping or by merely dropping into the vessel. If full polymerization is to be achieved in the column, the fall time in the column must be sufficiently long to permit this. Generally the fall time in the column is not more than 30 minutes, and a post-polymerization stage is then usually desirable.

The bead polymerization conditions to which the beads are exposed in the post polymerization stage (after discharge from the column) can be conventional conditions in which the suspension of beads in non-aqueous liquid is subjected to agitation in conventional manner so as to keep the beads in dispersion in the non-aqueous liquid.

The overall polymerization conditions are generally such that the total period between introducing the monomer into the non-aqueous liquid and completion of polymerization is between about ¼ hour and 3 hours, more usually between about ½ hour and 1 or 1½ hours.

The process can be conducted substantially continuously with the result that there is a substantially uniform residence time in the process for all the material which is being polymerised. Often, however, it is more convenient to conduct the process batchwise, wherein during each batch there is continuous addition of monomer until all the monomer has been added, there is continuous upflow of non-aqueous liquid until all the beads have fallen through it, and the final polymerization is conducted for sufficient time to ensure that full polymerization has occurred of the beads which were introduced last.

The non-aqueous liquid usually needs to be purged with nitrogen during the process and conveniently this is conducted during the recycle of the non-aqueous liquid from the top of the column back to the base of the column.

The recovery of dry beads from the final polymerization suspension involves removing the water and separating the beads from the non-aqueous liquid. Preferably it also involves removing unreacted monomer. Preferably the final suspension (ie after the final polymerization) of beads in non-aqueous liquid is subjected to azeotropic distillation (i.e., distillation which removes both water and non-aqueous liquid). After distillation to reduce the water content to, for instance, below 10% by weight of the beads they may then be separated from the residual non-aqueous liquid by filtration or centrifugation and may then be subjected to further drying, for instance fluid bed drying.

The monomers which can be used for making the polymers of the invention can be any of those conventionally used for the production of water soluble or superabsorbent polymer beads from ethylenically unsaturated material. The monomers are usually acrylic monomers.

A preferred non-ionic monomer is acrylamide.

Preferred anionic monomers are ethylenically unsaturated carboxylic acids (such as acrylic acid) or sulphonic acid (such as AMPS) Often they are in the form of sodium, ammonium or other water soluble salts.

Ethylenically unsaturated cationic monomers include dialkylaminoalkyl (meth) -acrylates and -acrylamides and their acid addition and quaternary ammonium salts, such as dimethylaminoethyl (meth) acrylate quaternary salts, and quaternary diallyl dialkyl monomers such as diallyl dimethyl ammonium chloride (DADMAC).

When the beads are to be superabsorbent, the monomers are usually anionic (for instance acrylic acid or salt such as sodium acrylate) or a blend thereof with acrylamide. When the polymer is to be water soluble, it may be non-ionic (for instance polyacrylamide homopolymer) or anionic or cationic and is often formed from a blend of acrylamide or other water soluble non-ionic monomer with ionic monomer.

Water soluble bead polymers are typically used as viscosifiers or flocculants, including retention aids for paper making. They can be anionic, cationic or non-ionic. Typically they have intrinsic viscosity (IV), measured by a suspended level viscometer at 25° C. in 1N sodium chloride solution buffered to pH7, of at least 4 dl/g although lower IV beads (e.g., IV 1–4 dl/g) of cationic polymers such as poly DADMAC can also be made by this process and used as coagulants. The IV will usually always be above about 0.5 dl/g since lower molecular weight polymers tend to be difficult to put into satisfactory dry bead form.

Gel permeation chromatography beads may be formed of acrylamide or blends of acrylamide with other monomers and sufficient polyethylenic cross linker to restrict their swelling in water to 0.2 to 2 times their weight, e.g., 15 to 30%.

When active ingredient is included in the aqueous monomer feed, that active ingredient will be dispersed in the final matrix of the polymer in each polymer bead. The active ingredient may be, for instance, an enzyme. The invention is of particular value therefore in the immobilisation of enzymes, for instance for use in a chemical reaction, since it is possible to provide beads having a very uniform size and therefore a very uniform availability of enzyme. Other active ingredients which can be trapped in the beads in this manner include agriculturally and horticulturally useful active ingredients such as fertilisers, nutrients, herbicides, pesticides (including fungicides).

These beads may either be linear or cross linked. For instance the gel immobilisation beads for enzymes are usually cross linked. The mean particle size is usually between 0.5 and 2 mm.

The distribution of sizes of polymer beads can, in the invention, be controlled primarily by the distribution of sizes of the extrusion orifices and the extrusion conditions. If (as is usual) all the orifices have substantially the same size then it is possible in the invention to obtain beads which are substantially all of the same size. Accordingly the invention is useful both where a narrow size range is desirable (e.g., as flocculant or viscosifier) and where it is essential for optimum performance (e.g., in a slow release composition).

According to a second aspect of the invention we provide novel beads of water soluble or water swellable polymeric material. These beads are obtainable by the process of the invention. They are formed from a water soluble ethylenically unsaturated monomer or monomer blend and have a mean particle size generally in the range 0.05 to 5 mm, preferably 0.1 to 3 mm, and at least 95% by weight of the beads have a size at least 50% of the mean particle size. Usually at least 98%, and generally at least 99%, by weight of the particles have a size at least 50% of the mean particle size. In particular, preferred beads of the invention have at least 95%, usually at least 98% and preferably at least 99% by weight of the beads having a size at least 70% and usually at least 80 to 90% of the mean particle size.

These values indicate that the proportion of fines is extremely low and indeed it is usually substantially zero. Often the beads have 99.9% by weight of the particles with a size above 50% and often above 80% of the mean particle size.

The standard deviation of the beads, from the mean particle size, is preferably below 0.1, and most preferably is below 0.05. Usually it is above 0.01. These standard deviations are extremely narrow and indicate a very narrow particle size distribution.

The relative standard deviation is usually below 5% and preferably below 3%. It can be as low as 0.5% but is usually at least 1%.

The narrow size distribution in the invention is obtainable in the direct product of the described process, and thus it is not necessary to sieve or otherwise fractionate the bead product to obtain this distribution.

In one aspect of the invention, the novel beads are provided in relatively large quantities, for instance containers containing at least 1 kg and usually at least 10 kg of the beads. This is commercially convenient and possible in the invention because of the ease of manufacturing the novel beads by the novel process.

In another aspect of the invention the beads are of water soluble polymeric material.

In another aspect of the invention the beads contain an active ingredient distributed substantially uniformly through the polymeric material, which is often a cross linked material.

Figure 2:
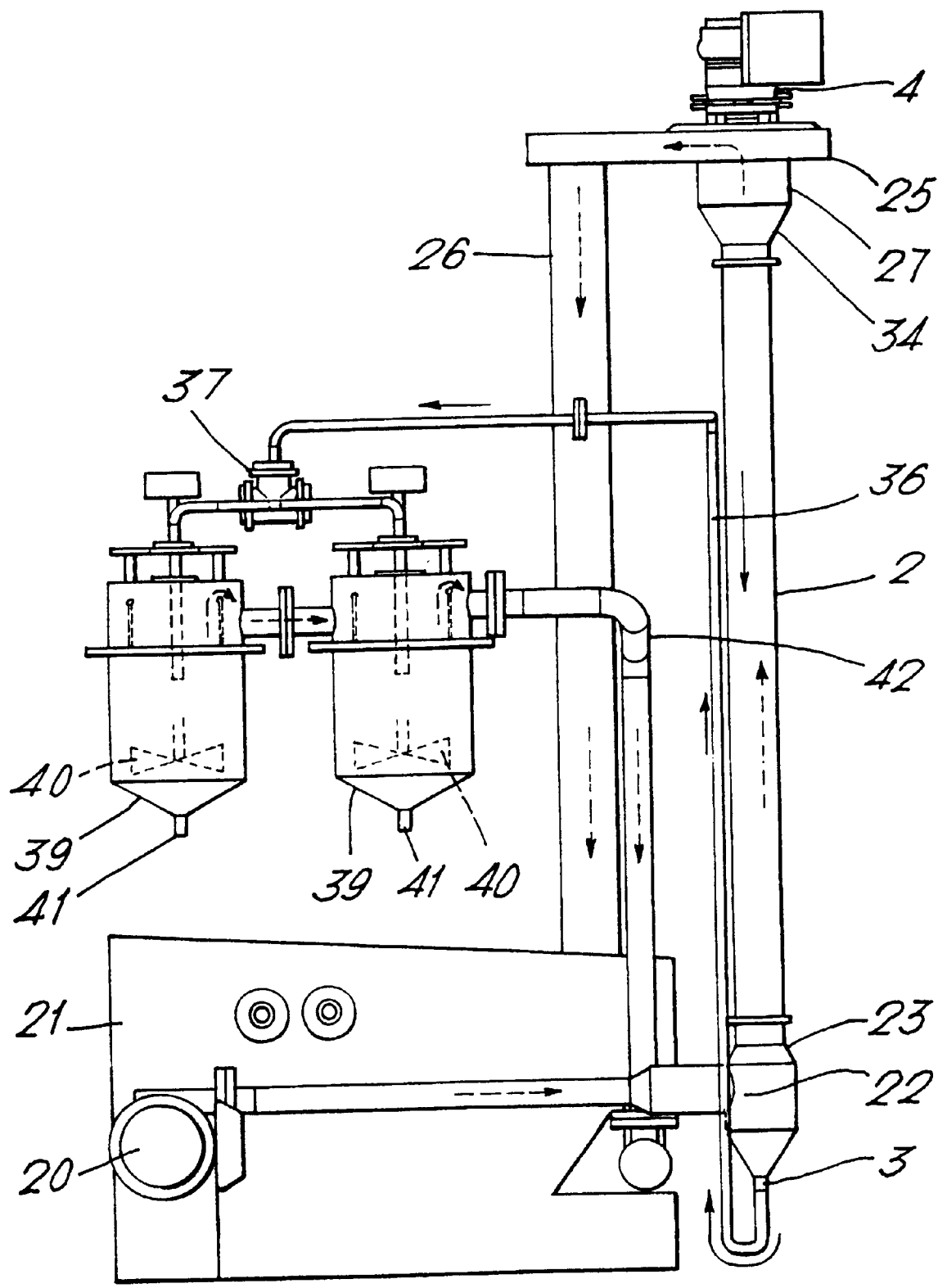
Figure 3:
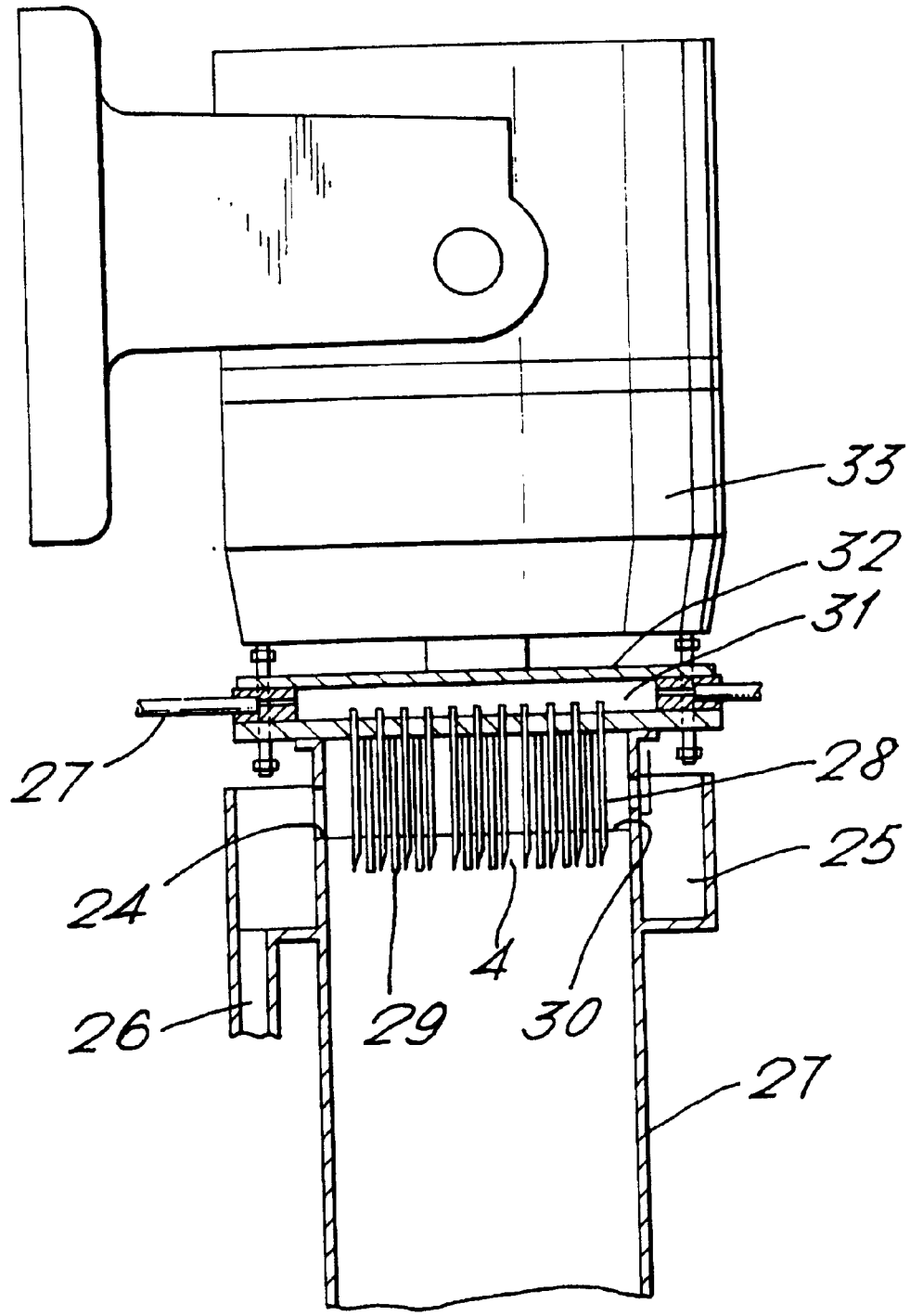

Suitable apparatus for the conduct of the invention is illustrated diagrammatically in the accompanying drawings in which FIG. 1 shows one type of apparatus, and FIG. 2 shows another type of apparatus, and FIG. 3 shows an extrusion device for forming the monomer beads.

The apparatus of FIG. 1 comprises an upright vessel 1 which defines a substantially vertical column 2 of non-aqueous liquid. This column extends between a discharge point 3 at the base of the column and the vessel and a monomer feed point 4 at the top of the column. A side arm 5 leads from the vessel whereby fluid from the column 2 moving up through the vessel is diverted into a collector 7. The vessel extends upwardly to define a short substantially static column of liquid.

A nitrogen purge 8 is provided in the collector 7 whereby fluid can be purged with nitrogen prior to being recycled through line 9 by pump 10 and column 11 into reaction vessel 12 into which the discharge point 3 discharges.

Aqueous monomer is fed by pump 13 through a pulsed ejection system 14 by which it either drops down through a distance h on to the upper surface 15 of the liquid in the part 6 of the vessel or, more usually, is ejected under the surface 15 of the liquid.

Non-aqueous liquid is pumped down vessel 11, through reactor 12 and up through vessel 1, thereby forming an upwardly moving vertical column 2 of non-aqueous liquid extending between the points 3 and 4. The flow is substantially non-turbulent in that there are no baffles in the column 2 and the beads of polymerising material drop down through the column following a substantially linear path.

In the apparatus of FIG. 2 the column 2 is supplied with a flow of non-aqueous liquid (the direction of flow being shown by broken arrows) by a pump 20 from a reservoir 21. The incoming non-aqueous liquid enters the column at a point 22 which is above the discharge point 3 and below a neck 23 where the column splays outwardly. Accordingly the rate of flow of the non-aqueous liquid increases as it passes through the neck and up into the main length of column, which is narrower. The liquid flows upwardly to a weir 24 (as shown in FIG. 3) and overflows at the weir into a surrounding collector 25 from which it discharges by pipe 26.

The top portion 27 of the column has a larger diameter than the main length so that the rate of upflow decreases as the column diameter increases, and is connected to the main length of the column by a tapering collar 34.

Monomer is extruded into the non-aqueous liquid by needles 28 having orifices 29 positioned just beneath the level 30 of the top of the liquid. These needles communicate between the orifices 29 and a supply chamber 31 into which the aqueous monomer feed 27 is pumped. One side 32 of the supply chamber is defined by a diaphragm which is caused to vibrate with a vertical motion by an electromagnetic vibrator 33.

Monomer is discharged from these needles into the upflowing liquid and falls downwardly as polymerising beads, the direction of movement being shown by solid arrows. The downflow accelerates as the liquid passes the collar 34 and subsequently decelerates as the liquid passes the collar 23 and the beads accumulate at the discharge point 3 at the base of the column. From here they may be pumped as a slurry up through duct 36 and discharged from valve 37 into one of the reactor vessels 39. Each of these is provided with a stirrer shown diagrammatically as 40 and with suitable outlet means 41 for removing sedimented beads from the base. Non-aqueous liquid falls over a weir and returns to reservoir 21 via ducting 42. Product is removed from vessels 39 via drain or other outlet means 41 prior to distillation in other equipment.

Appropriate means for purging the non-aqueous liquid with nitrogen in the reservoir 21 and, when necessary, in the reactor vessels 39 are provided but, for simplicity, are not shown.

The following are examples of the invention.

EXAMPLE 1

An anionic water soluble monomer mixture consisting of

| | |
|---|---|
| Acrylamide (50% aqueous solution) | 58 g |
| Sodium Acrylate (50% aqueous solution 50% neutralised) | 25 g |
| Sodium Hydroxide (46% aqueous solution) | 5 g |
| Urea (100%) | 0.9 g |
| Water | 12 g | was prepared, and adjusted to pH 6.0. The solvent phase as Exxsol D240/270, trade mark for a dearomatised hydrocarbon solvent of boiling range 242° C. to 270° C. and flashpoint of 118° C.

Amphipathic stabiliser was added at a level of between 0.05% and 1% on weight of solvent phase.

Thermal initiators were then added to the aqueous monomer phase typically between 0.001% and 0.1% on monomer phase. These could typically be a di-azo compound such as 2,2'-Azobis [2-(2-imidazolin-2-yl)propane] dihydrochloride, 2,2'-Azobis(2-amidinopropane) dihydrochloride or 4–4'-Azobis (4-cyanopentanoic acid), or a peroxy compound such as ammonium persulphate, singularly or in combination.

The solvent phase was purged of $O_2$ prior to the addition of the aqueous monomer phase by bubbling $N_2$ at a flow rate of 1 litre per minute. The $N_2$ was then continuously bubbled through the solvent phase whilst monomer transfer took place.

The solvent was heated to and maintained at a temperature of 80° C. whilst being pumped around the system at a flowrate of approximately 500 mls per minute.

The aqueous monomer phase was introduced into the solvent phase through a vibrating 5-nozzle assembly at a flow rate of 5 ml per minute per nozzle. The nozzle assembly was oscillated at a frequency of 60 to 80 Hz. The nozzle diameter was 0.51 mm.

The counter current solvent flow was controlled in order to allow the polymerising aqueous phase a minimum time of 1 minute to "skin over" before it reached the column bottom. This was to ensure that coalescence would not occur. The resultant slurry of non-coalescent beads was transferred to a holding vessel and subjected to further polymerization at 80° C. for ½ hour.

By this process it was possible to obtain beads having a mean particle size of 1.49 mm, a minimum of 1.42 mm, a maximum of 1.55 mm, a standard deviation of 0.04 and a relative standard deviation of 2.68%.

EXAMPLE 2

An aqueous, cationic, water soluble, monomer mixture consisting of

| | |
|---|---|
| Acrylamide (50% aqueous solution) | 79 g |
| Adipic Acid (100%) | 3 g |
| Methacryloyloxy ethyl trimethyl ammonium chloride (70% aqueous solution) | 1.4 g |
| Acryloyloxy ethyl trimethyl ammonium chloride (70% aqueous solution) | 15 g |
| Urea (100%) | 1.8 g | was prepared and adjusted to pH 4.0. The solvent phase was Exxsol D240/270.

Amphipathic stabiliser was added at a level of 1000 ppm on weight of solvent phase.

Thermal initiators were then added as in Example 1 and the solvent phase was purged as in Example 1.

The solvent was heated to and maintained at a temperature of 67° C.–71° C. whilst being pumped around the system at a flowrate of approximately 330 mls per minute.

The aqueous monomer phase was introduced into the solvent phase through a vibrating 5 nozzle assembly at a flow rate of 5 ml per minute per nozzle. The nozzle assembly was oscillated at a frequency of 60 to 80 Hz. The nozzle diameter was 0.51 mm.

The counter current solvent flow was controlled in order to allow the polymerising aqueous phase a minimum time of 2 minutes to "skin over" before it reached the column bottom. This was to ensure that coalescence would not occur. The resultant slurry was subjected to further polymerization at 67 to 71° C. for ½ hour.

By this means it was possible to obtain beads having a mean diameter of 1.44 mm, a minimum of 1.33 mm, a maximum of 1.47 mm, a standard deviation of 0.03 and a relative standard deviation of 2.08%.

EXAMPLE 3

A cross linked monomer mixture consisting of

| | |
|---|---|
| Acrylic Acid (80% solution) | 36 g |
| Sodium Hydroxide (46% solution) | 26 g |
| Water | 38 g | was prepared and adjusted to pH 4.0. The solvent phase, purging and initiator were as in Example 1.

Amphipathic stabiliser was added at a level of 500 ppm on weight of solvent phase.

Cross linking agent was added to the aqueous monomer phase in the form of Tetrallylammonium chloride or Methylene-Bis Acrylamide, typically at a level of 0.05% to 0.2% on monomer phase.

The solvent was heated to and maintained at a temperature of 90° C. whilst being pumped around the system at a flowrate of approximately 500 mls per minute.

The aqueous monomer phase was introduced into the solvent phase through a vibrating 5 nozzle assembly at a flow rate of 5 ml per minute per nozzle. The nozzle assembly was oscillated at a frequency of 20 to 100 Hz. The nozzle diameter was 0.26 mm.

The counter current solvent flow was controlled in order to alow the polymerising aqueous phase a minimum time of 1 minute to "skin over" before it reached the column bottom. This was to ensure that coalescence would not occur. The slurry was then subjected to further polymerization at 90° C. for ½ hour.

By this means it was possible to obtain beads having a mean diameter of 0.78 mm, a minimum of 0.74 mm, a maximum of 0.82 mm, a standard deviation of 0.01 and a relative standard deviation of 1.28%.

What is claimed is:

1. A reverse phase bead polymerization process for the manufacture of polymer beads comprising forming aqueous monomer beads of an aqueous solution of water-soluble ethylenically unsaturated monomer or monomer blend and polymerising the monomer or monomer blend in the presence of initiator to form polymer beads that are soluble in water suspended in a non-aqueous liquid, and recovering dry polymer beads, characterised in that the process comprises providing in an upright vessel a substantially continuously upflowing, substantially non-disruptive, substantially vertical column of non-aqueous liquid wherein the column extends upwardly between a discharge point at its base and a monomer feed point at its top, extruding the aqueous monomer or monomer blend as aqueous monomer beads through orifices into, or non-shatteringly onto, the non-aqueous liquid in the presence of initiator and at a temperature whereby polymerization initiates substantially immediately upon contact between the aqueous monomer beads and the non-aqueous liquid, the extrusion of the beads into or onto the non-aqueous liquid being conducted at a position which is the monomer feed point or which is above and in substantially non-turbulent non-aqueous fluid communication with the monomer feed point, allowing the polymerising beads to float downwardly, countercurrent to the upflowing liquid, to the discharge point, selecting the initiator and the rate of upflow of the column such that the beads are substantially non-coalescent when they reach the discharge point and such that the time for the beads to fall from the feed point to the discharge point is at least ½ minute, removing a suspension of the non-coalescent beads in non-aqueous liquid from the column at the discharge point, and recovering dry water soluble or superabsorbent beads from the suspension.

2. A process according to claim 1 in which the beads are extruded into the non-aqueous liquid or onto the non-aqueous liquid from a height of less than 20 mm above the liquid.

3. A process according to claim 1 in which the beads are extruded onto or into stationary non-aqueous liquid which communicates with the column, or onto or into an upper portion of the column which flows upwardly at a slower rate than the remainder of the column.

4. A process according to claim 1 in which the aqueous monomer is extruded as beads by a pulsed supply through the orifices at a frequency of 20 to 100 Hz.

5. A process according to claim 1 in which an amphipathic polymeric stabiliser is included in the non-aqueous liquid.

6. A process according to claim 1 in which the aqueous monomer blend includes 0–2000 ppm cross linking agent and the polymer beads are water-soluble or superabsorbent.

7. A process according to claim 1 in which the aqueous monomer blend is free of added cross linking agent and the polymer beads are water soluble polymer having intrinsic viscosity at least 4 dl/g and suitable for use as flocculant or viscosifier.

8. A process according to claim 1 in which the beads are gel permeation chromatography beads.

9. A process according to claim 1 in which an active ingredient is included in the aqueous beads and in the polymer beads.

10. A process according to claim 1 in which the time for the beads to fall from the feed point to the discharge point is about ½ to 30 minutes, and the suspension which is removed from the column at the discharge point is maintained under bead polymerization conditions while the polymerization of the beads is completed.

11. Beads of water soluble or water swellable polymeric material formed from a water soluble ethylenically unsaturated monomer or monomer blend and having a mean particle size in the range 0.05 to 5 mm whose standard deviation is less than 0.1 characterised in that at least 95% by weight of the beads have a size which is at least 50% of the mean particle size.

12. Beads according to claim 11 in which at least 99% by weight of the beads have a size at least 80% of the mean particle size.

13. Beads according to any of claim 11 wherein the mean particle size has a relative standard deviation of less than 5%.

14. Beads according to any of claim 11 packed in a container containing at least 1 kg.

15. Beads according to any of claim 11 which are of water soluble or superabsorbent polymeric material made using 0–2000 ppm ethylenically unsaturated cross linking agent.

16. Beads according to claim 15 which are water soluble and have intrinsic viscosity above 4 dl/g.

17. Beads according to any of claim 11 and which have an active ingredient distributed through the polymeric material.

18. Beads according to claim 11 which are cross linked gel permeation chromatography beads or slow release beads.

* * * * *